United States Patent
Tange et al.

(10) Patent No.: US 6,298,298 B1
(45) Date of Patent: Oct. 2, 2001

(54) VEHICULAR VELOCITY CONTROLLING APPARATUS AND METHOD TO FOLLOW UP A PRECEDING VEHICLE RUNNING AHEAD OF VEHICLE

(75) Inventors: Satoshi Tange, Kanagawa; Kenichi Egawa, Tokyo; Tetsuya Asada; Akira Higashimata, both of Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/592,565

(22) Filed: Jun. 12, 2000

(30) Foreign Application Priority Data

Jun. 15, 1999 (JP) ................................. 11-168262

(51) Int. Cl.$^7$ ............................. G06F 7/00; G06F 17/00
(52) U.S. Cl. ............................................. 701/96; 340/435
(58) Field of Search .................. 701/96, 93, 79, 701/72; 340/435, 438

(56) References Cited

U.S. PATENT DOCUMENTS

| | | | |
|---|---|---|---|
| 4,757,450 | * | 7/1988 | Etoh ......................................... 701/96 |
| 5,161,632 | * | 11/1992 | Asayama .............................. 180/167 |
| 6,081,762 | * | 6/2000 | Richardson et al. .................... 701/93 |
| 6,161,073 | * | 12/2000 | Tange et al. ........................... 701/96 |

FOREIGN PATENT DOCUMENTS

| | | |
|---|---|---|
| 7-47864 | 2/1995 | (JP) . |
| 11-314537 | 11/1999 | (JP) . |

* cited by examiner

*Primary Examiner*—William A. Cuchlinski, Jr.
*Assistant Examiner*—Olga Hernandez
(74) *Attorney, Agent, or Firm*—Foley & Lardner (57) ABSTRACT

In vehicular velocity controlling method and apparatus for an automotive vehicle, an inter-vehicle distance from the vehicle to a preceding vehicle which is running ahead of the vehicle is detected, a relative velocity of the vehicle to the preceding vehicle is detected, a vehicular velocity of the vehicle is detected, a target value of the vehicular velocity to make a detected value of the inter-vehicle distance substantially equal to a target value of the inter-vehicle distance is calculated on the basis of the detected value of the inter-vehicle distance and a detected value of the vehicular velocity, the vehicular velocity is controlled to make the detected value of the vehicular velocity substantially equal to the target value of the vehicular velocity, a magnitude of a turning (for example, a lateral acceleration) of the vehicle is detected, a correction coefficient of the magnitude of the turning of the vehicle is calculated in accordance with the detected value of the vehicular velocity, and the target value of the vehicular velocity is corrected on the basis of the turning magnitude correction coefficient by which the detected value of the turning magnitude is corrected.

14 Claims, 7 Drawing Sheets

VEHICULAR VELOCITY CONTROLLING APPARATUS AND METHOD TO FOLLOW UP A PRECEDING VEHICLE RUNNING AHEAD OF VEHICLE

BACKGROUND OF THE INVENTION a) Field of the Invention

The present invention relates to vehicular velocity controlling apparatus and method to follow up a preceding vehicle which is running ahead of the vehicle with an appropriate inter-vehicle distance maintained.

b) Description of the Related Art

A Japanese Patent Application First Publication No. Heisei 7-47864 published on Feb. 21, 1995 exemplifies a previously proposed vehicular velocity controlling apparatus enabled for the vehicle to follow up the preceding vehicle at a safe inter-vehicle distance.

In the previously proposed vehicular velocity controlling apparatus, the safe inter-vehicle distance to the preceding vehicle is determined with a road surface condition and a vehicular running state taken into consideration and an engine output is controlled to make an actual inter-vehicle distance to the preceding vehicle substantially equal to the safe inter-vehicle distance.

SUMMARY OF THE INVENTION

Since, in the previously proposed vehicular velocity controlling apparatus, the safe inter-vehicle distance is determined and the engine output is controlled to make the actual inter-vehicle distance coincident with the safe inter-vehicle distance even when the vehicle is running on a curved road, the vehicle is, in a steady state, running to follow up the preceding vehicle at the same velocity as the preceding vehicle. Hence, it cannot be guaranteed that the vehicular velocity on the curved road is appropriate for the vehicle to run on the curved road. The vehicular velocity of the preceding vehicle is often too fast to a vehicular occupant(s). Consequently, the same vehicular velocity as the preceding vehicle gives the vehicular driver a mismatch to the driver's driving sense.

Another proposed vehicular velocity controlling apparatus has been proposed in which a vehicular velocity decrement variable (deceleration) of a target vehicular velocity is calculated uniquely according to a magnitude of a lateral acceleration developed on a vehicular body of the vehicle and the target vehicular velocity is corrected in accordance with the decrement variable. In the other previously proposed vehicular velocity controlling apparatus, such a trade-off would occur that the vehicle is too decelerated in a low velocity region and, on the other hand, has insufficient decrement variable in a high velocity region.

It is, therefore, an object of the present invention to provide vehicular velocity controlling apparatus and method which can perform an appropriate preceding vehicle follow-up run control during a turning of the vehicle on a curved road (so-called, a cornering) without giving the vehicular driver a mismatch to the driver's sense of a vehicular driving.

According to one aspect of the present invention, there is provided a vehicular velocity controlling apparatus for an automotive vehicle, comprising: an inter-vehicle distance detector to detect an inter-vehicle distance from the vehicle to a preceding vehicle which is running ahead of the vehicle; a relative velocity detector to detect a relative velocity of the vehicle to the preceding vehicle; a vehicular velocity detector to detect a vehicular velocity of the vehicle; an inter-vehicle distance controlling section that calculates a target value of the vehicular velocity to make a detected value of the inter-vehicle distance substantially equal to a target value of the inter-vehicle distance on the basis of the detected value of the inter-vehicle distance and a detected value of the vehicular velocity; a vehicular velocity controlling section that controls the vehicular velocity to make the detected value of the vehicular velocity substantially equal to the target value of the vehicular velocity; a vehicular turning magnitude detector to detect a magnitude of a turning of the vehicle, a correction coefficient calculating section that calculates a correction coefficient of the magnitude of the turning in accordance with the detected value of the vehicular velocity; and a target vehicular velocity correcting section that corrects the target value of the vehicular velocity on the basis of the turning magnitude correction coefficient by which the detected value of the turning magnitude is corrected.

According to another aspect of the present invention, there is provided a vehicular velocity controlling method for an automotive vehicle, comprising: detecting an inter-vehicle distance from the vehicle to a preceding vehicle which is running ahead of the vehicle; detecting a relative velocity of the vehicle to the preceding vehicle; detecting a vehicular velocity of the vehicle; calculating a target value of the vehicular velocity to make a detected value of the inter-vehicle distance substantially equal to a target value of the inter-vehicle distance on the basis of the detected value of the inter-vehicle distance and a detected value of the vehicular velocity; controlling the vehicular velocity to make the detected value of the vehicular velocity substantially equal to the target value of the vehicular velocity; detecting a magnitude of a turning of the vehicle; calculating a correction coefficient of the magnitude of the turning of the vehicle in accordance with the detected value of the vehicular velocity; and correcting the target value of the vehicular velocity on the basis of the turning magnitude correction coefficient by which the detected value of the turning magnitude is corrected.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1A:
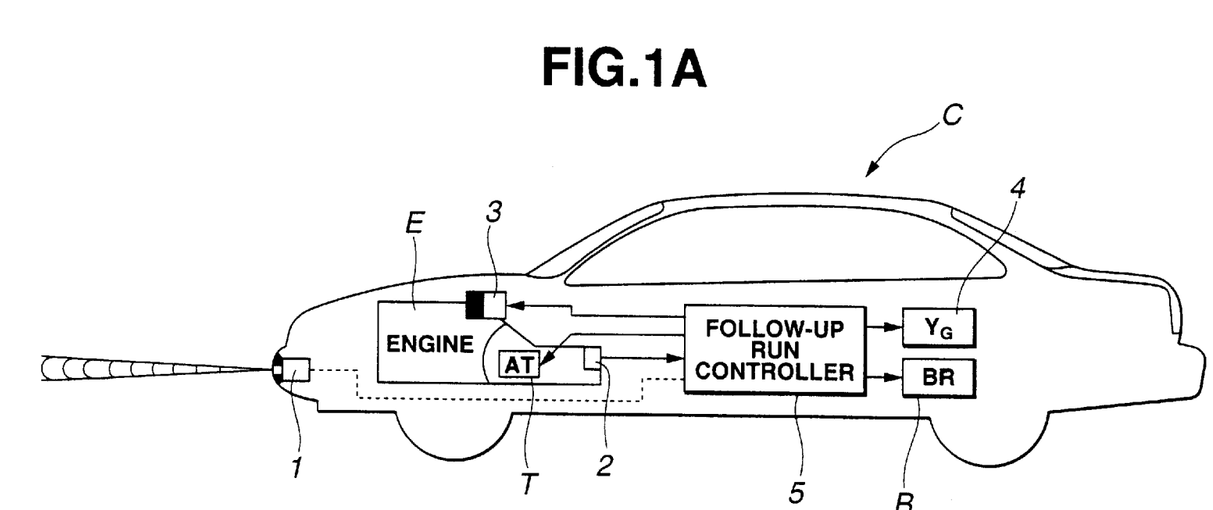
FIG. 1A is a schematic circuit block diagram of a preferred embodiment of a vehicular velocity controlling apparatus applicable to a rear road wheel drive vehicle.

FIG. 1A shows a schematic circuit block diagram of a vehicular velocity controlling apparatus in a preferred embodiment according to the present invention.

In FIGS. 1A, C denotes an automotive vehicle in which the vehicular velocity controlling apparatus of the preferred embodiment is mounted. In the vehicle C, a radar unit type inter-vehicle distance sensor 1 (simply, referred to as an inter-vehicle distance sensor) is disposed on a front end of the vehicle C to sweep a laser beam in a front width-wise direction (a front detection zone) of the vehicle C and receives a reflected laser beam from an object (namely, so-called, a preceding vehicle which is running ahead of the vehicle) present in the front width-wise direction. It is noted that the inter-vehicle distance sensor 1 may measure the inter-vehicle distance to the trapped preceding vehicle utilizing an electric wave or ultrasonic wave.

A rotational driving force developed on an engine E (a rotary driving force) is transmitted through an automatic transmission T to drive wheels such as rear road wheels or front road wheels. A gear ratio of the automatic transmission T is controlled via an automatic transmission controller TA according to a vehicular velocity and an engine torque. A vehicular brake system B including a disc brake disposed on each road wheel is installed in the vehicle C.

A vehicular velocity sensor 2 is attached onto an output axle of the automatic transmission T. A pulse train signal is outputted having a period corresponding to a rotational velocity of the output axle of the automatic transmission T.

In addition, a throttle actuator 3 is disposed in the engine E to actuate an engine throttle valve to be open or closed in accordance with a throttle valve opening angle signal inputted thereto via an engine output controller 3A so that an intake air quantity supplied to the engine E is varied to adjust an engine output. A lateral acceleration sensor (or so-called, a lateral G sensor) 4 is disposed to detect a lateral acceleration $Y_G$ developed on a vehicular body. The lateral G sensor 4 outputs a voltage signal in accordance with a lateral acceleration $Y_G$.

Furthermore, a follow-up run controller 5 controls the throttle actuator 3, the automatic transmission T, and the vehicular brake system B.

The follow-up run controller 5 controls the throttle actuator 3, the automatic transmission T (gear ratio thereof), and the vehicular brake system B on the basis of the inter-vehicle distance L detected by the inter-vehicle distance sensor 1 and the vehicular velocity Vs of the vehicle C detected by the vehicular velocity sensor 2 so that the vehicle C can follow up the preceding vehicle, maintaining an appropriate inter-vehicle distance to the preceding vehicle.

Figure 1B:
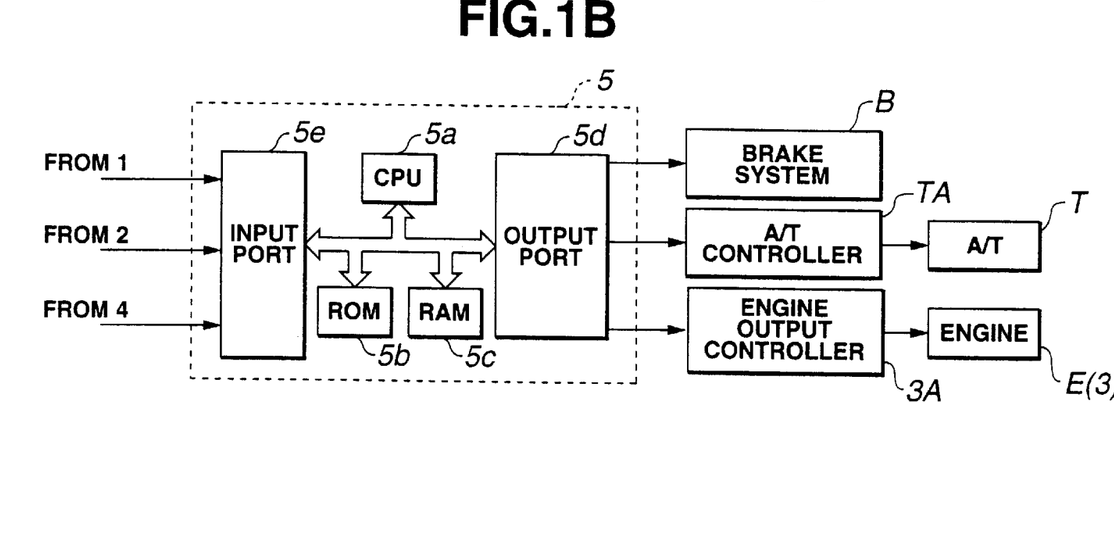
FIG. 1B is a schematic internal circuit block diagram of a follow-up run controller shown in FIG. 1A.

FIG. 1B shows an internal circuit configuration of the follow-up run controller 5 shown in FIG. 1A.

The follow-up run controller 5 includes a microcomputer having a CPU (Central Processing Unit) 5a, a ROM (Read Only Memory) 5b, a RAM (Random Access Memory) 5c, a common bus, an Input Port 5e, and an Output Port 5d. It is noted that a timer is provided in the CPU 5a.

Figure 2:
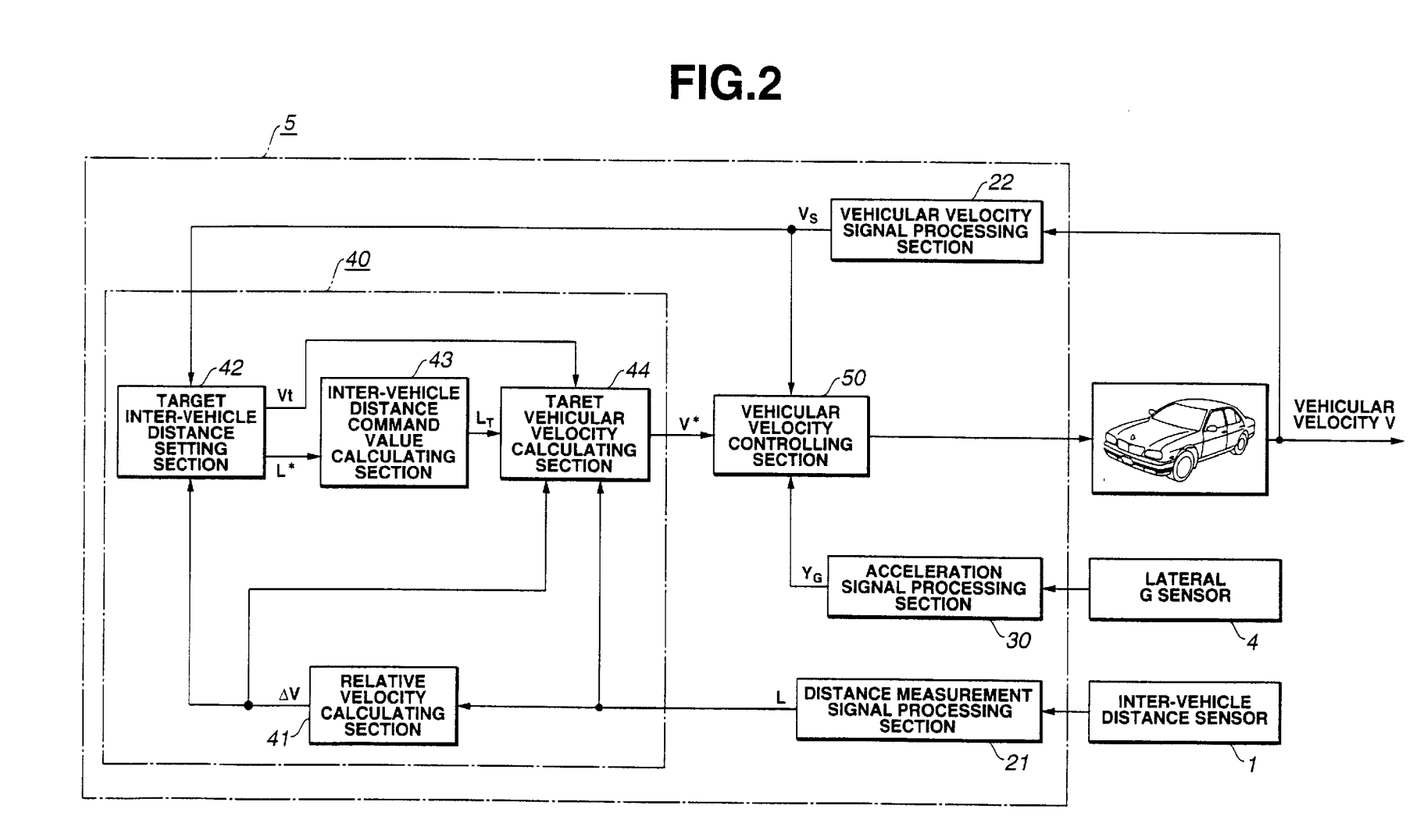
FIG. 2 is a functional circuit block diagram of a specific example of a follow-up run controller shown in FIG. 1B.

FIG. 2 shows a functional circuit block diagram of the vehicular velocity controlling apparatus shown in FIG. 1A.

The follow-up run controller 5 functionally includes: a distance measurement signal processing section 21 that measures a time duration from a time point at which the laser light beam is swept from the inter-vehicle distance sensor 1 to a time point at which the reflected laser light beam is received thereat to calculate the inter-vehicle distance L to the preceding vehicle; a vehicular velocity signal processing section 22 that measures a period of the vehicular velocity indicative pulse train signal from the vehicular velocity sensor 2; an acceleration signal processing section 30 including an analog-to-digital converter (A/D converter) to convert the output voltage signal from the lateral G sensor 4 to the corresponding digital value $Y_G$; an inter-vehicle distance controlling section 40 that calculates a target value of the vehicular velocity V* to maintain the inter-vehicle distance L calculated by the distance measurement signal processing section 21 at a target value of the inter-vehicle distance L* on the basis of the inter-vehicle distance L and the vehicular velocity Vs calculated by the vehicular velocity signal processing section 22; and a vehicular velocity controlling section 50 that controls the vehicular velocity Vs of the vehicle to make the detected value Vs of the vehicular velocity substantially equal to the target value of the vehicular velocity V* by controlling the opening angle of the throttle valve of the engine E through the throttle actuator 3, the gear ratio of the automatic transmission T, and a braking pressure of the vehicular brake system B on the basis of the target value of the vehicular velocity V* and the relative velocity ΔV.

The relative velocity calculating section 41 is constituted by a band pass filter (BPF) which processes the inputted inter-vehicle distance L in a, e.g., band pass filter.

The band pass filter has its transfer function that can be expressed in the following equation (1).

Since a differential term of a Laplace transform operator s is included in a numerator of the equation (1), the relative velocity ΔV is substantially approximated from the differentiation of the inter-vehicle distance L.

$$F(s) = \omega c^2 s/(s^2 + 2\zeta c\omega cs + \omega c^2) \qquad (1).$$

It is noted that, in the equation (1), ωc=2πfc and ζc denotes a damping factor.

As described above, since the band pass filter having the transfer function as given by the equation (1) is used as the relative velocity calculating section 41, the calculation of the relative velocity ΔV through the use of the band pass filter having the transfer function as expressed in the equation (1) can avoid such inconveniences that a case wherein the relative velocity ΔV is calculated through a simple differential calculation from a variation rate of the inter-vehicle distance per unit time is susceptible to noise interference and is easy to give an ill influence on a vehicular behavior so that fluctuations in the vehicular body occur during the follow-up run control.

It is noted that a cut-off frequency fc of the equation (1) is determined according to a magnitude of a noise component included in the inter-vehicle distance L and an allowance value of the vehicular body in a short period of time.

In addition, the calculation of the relative velocity ΔV may alternatively be carried out by a differential process using a high pass filter to the inter-vehicle distance L in place of the band pass filter described above.

In addition, the target inter-vehicle distance setting section 42 calculates the target inter-vehicle distance L* in accordance with the following equation (2) from a vehicular velocity of the preceding vehicle (Vt=Vs+ΔV) calculated by an addition of the vehicular velocity to the relative velocity ΔV and at a time duration To (so-called, an inter-vehicle time duration) during which the vehicle has reached to a position $L_0$ (meters) behind the present position of the preceding vehicle.

That is to say, $$L^* = Vt \times T_0 + Ls \quad (2).$$

Since a concept of the inter-vehicle distance time duration is introduced into the calculation of the target inter-vehicle distance L* is set in such a manner that as the vehicular velocity becomes faster, the inter-vehicle distance becomes large (wide).

In the equation (2), Ls denotes an initial inter-vehicle distance when the vehicle stops.

Furthermore, the inter-vehicle distance calculating section 43 calculates the command value $L_T$ of the inter-vehicle distance on the basis of the actual inter-vehicle distance L, the target inter-vehicle distance L*, and the relative velocity ΔV to follow up the preceding vehicle maintaining the inter-vehicle distance L* in a second lag order form is carried out in accordance with a reference model $G_T(s)$ expressed in the following equation (3) using the damping factor ζc and the specific angular frequency ωc determined for the response characteristic to be the target vehicular velocity so that the inter-vehicle distance command value $V_T$ is calculated.

$$G_T(s) = \omega n^2 / (s^2 + 2\zeta \omega ns + \omega n) \quad (3).$$

Furthermore, the target vehicular velocity calculating section 44 calculates the target vehicular velocity V* using a feedback compensator on the basis of the inputted inter-vehicle distance command value $L_T$.

That is to say, the target relative velocity ΔV is first calculated, as expressed in an equation (4), by subtracting a linear connection between a value of a multiplication of a distance control gain fd and a deviation (L*−L) between the target inter-vehicle distance L* and the actual inter-vehicle distance L and a value of the multiplication of a velocity control gain fv with the relative velocity ΔV from a vehicular velocity of the vehicular velocity Vt of the preceding vehicle.

Namely, $$V^* = Vt - \{fd(L_T - L) + fv \cdot V\} \quad (4).$$

The vehicular velocity controlling section 50 controls the opening angle of the engine throttle valve through the throttle actuator 3, the gear position of the automatic transmission T, and braking force of the vehicular brake system B via the brake actuator to make the vehicular velocity Vs substantially equal to the target vehicular velocity V* and carries out the correction of the vehicular velocity during the turning of the corner on the basis of the lateral acceleration $Y_G$ detected by the lateral acceleration sensor 4.

In details, the vehicular velocity controlling apparatus 50 executes a timer interrupt routine for every predetermined time duration (for example, 10 milliseconds) with respect to a main program routine.

Figure 3:
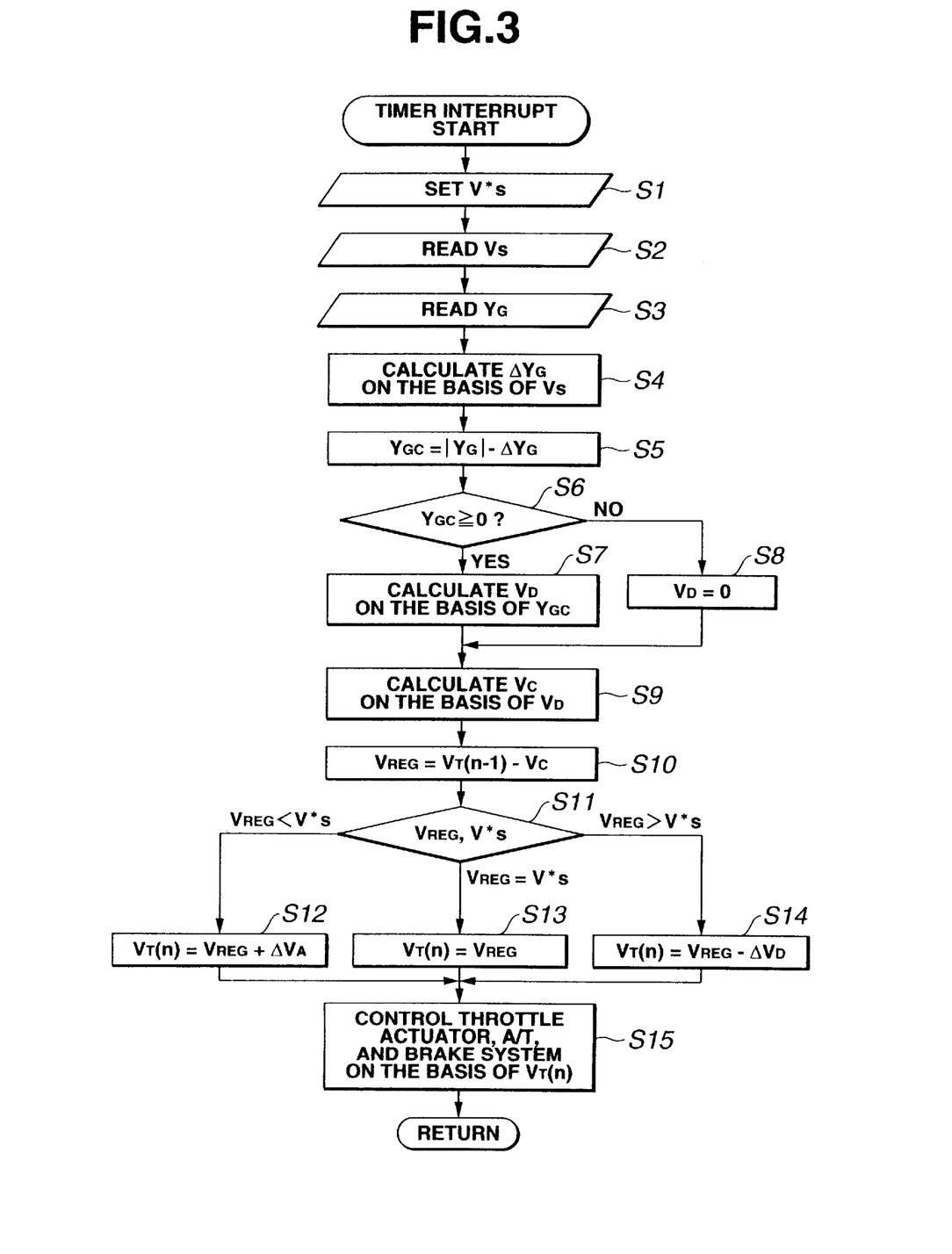
FIG. 3 is an operational flowchart executed as a vehicular velocity control procedure in a vehicular velocity controlling section shown in FIG. 2.

FIG. 3 shows a vehicular velocity control procedure as the timer interrupt routine in a case of the vehicular velocity controlling apparatus in the preferred embodiment shown in FIG. 1A.

First at a step S1, the vehicular velocity controlling section 50, namely, the follow-up run controller 5 reads the target vehicular velocity V* calculated by the inter-vehicle distance controlling section 40, reads the set vehicular velocity $V_{SET}$ by the vehicular driver, and selects one of the read vehicular velocity values V* and VSET which is smaller than the other as a selected target vehicular velocity V*s (V*s=MIN[V*, $V_{SET}$].

At the next step S2, the vehicular velocity controlling section 50 reads the vehicular velocity Vs from the vehicular velocity signal processing section 22.

At the next step S3, the vehicular velocity controlling section 50 reads the lateral acceleration value $Y_G$ converted by the lateral acceleration signal converting section 30.

Figure 4:
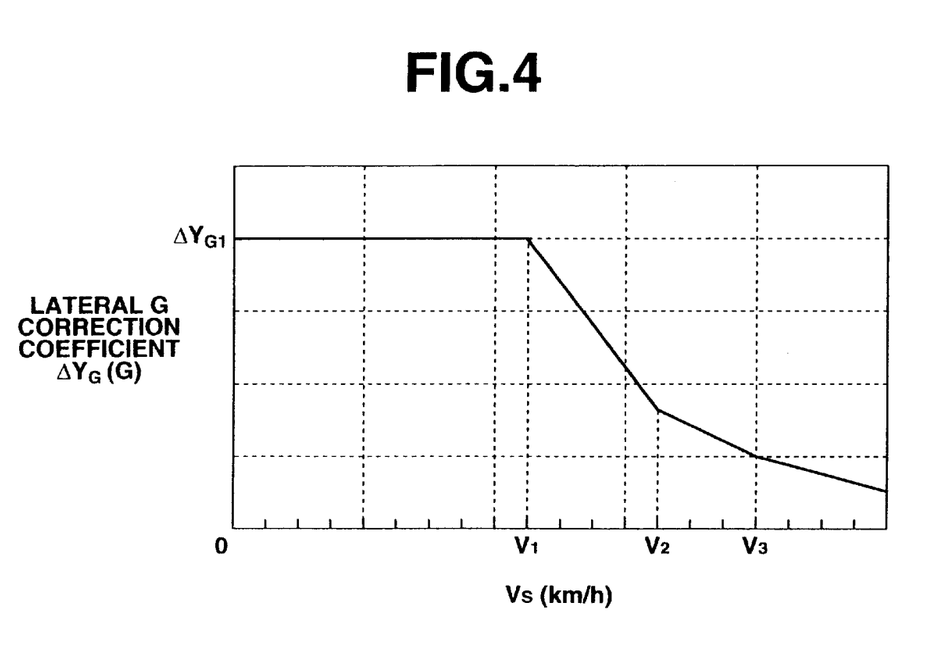
FIG. 4 is an explanatory view for explaining an correction coefficient calculation map with respect to a vehicular velocity of the vehicle.

At the next step S4, the vehicular velocity controlling section 50 calculates the correction coefficient $\Delta Y_G$ for the lateral acceleration $Y_G$ by referring to a correction coefficient calculation map shown in FIG. 4 on the basis of the read vehicular velocity Vs at the step S1. Then, the routine goes to a step S5.

It is noted that the correction coefficient calculation map has, as shown in FIG. 4, its lateral axis along which the vehicular velocity value Vs is taken and its longitudinal axis along which the correction coefficient $\Delta Y_G$ to the lateral acceleration $Y_G$ is taken.

For example, in a vehicular velocity region where the value of the vehicular velocity Vs is equal to or below a first predetermined velocity value V1, the correction coefficient $\Delta Y_G$ gives a first predetermined value $\Delta Y_{G1}$.

In another vehicular velocity region where the vehicular velocity Vs is in excess of the first predetermined velocity value V1 and is up to a second predetermined velocity value V2, the correction coefficient $\Delta Y_G$ is decreased by a relatively steep gradient in accordance with the increase in the vehicular velocity Vs. During a vehicular velocity region above the second predetermined velocity value V2 and up to a third predetermined velocity value V3, the correction coefficient $\Delta Y_G$ is decreased at a relatively moderate gradient as compared with the gradient in the above-described vehicular velocity Vs.

When the vehicular velocity Vs is in excess of a third predetermined velocity value V3, the correction coefficient $\Delta Y_G$ is decreased at the slightly more moderate gradient than the region at V2 to V3. These are appreciated from FIG. 4.

At the step S5, the vehicular velocity controlling section 50 calculates a lateral acceleration correction value $Y_{GC}$ by subtracting the correction coefficient $\Delta Y_G$ from an absolute value of the lateral acceleration $Y_G$ ($Y_{GC} = |Y_G| - \Delta Y_G$).

At the next step S6, the vehicular velocity controlling section 50 determines whether the lateral acceleration corrected value $Y_{GC}$ calculated at the step S4 is equal to zero or positive or not ($Y_{GC} \geq 0$).

If $Y_{GC} \geq 0$ (Yes) at the step S6, the routine goes to a step S7.

Figure 5:
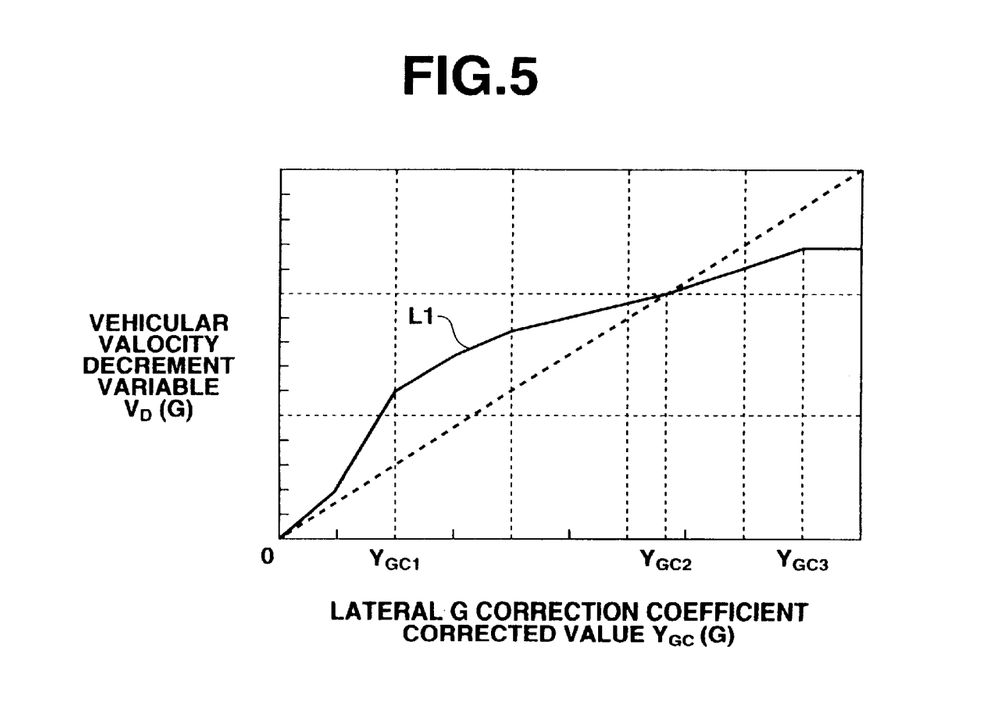
FIG. 5 is an explanatory view for explaining a vehicular velocity decrement variable calculation map with respect to a lateral acceleration correction coefficient.

At the step S7, the vehicular velocity controlling section 50 refers to a calculation map on a vehicular velocity decrement variable $V_D$ shown in FIG. 5 to derive a vehicular velocity decrement variable $V_D$ and the routine goes to a step S9. If $Y_{GC} > 0$ (No) at the step S6, the routine goes to a step S8. At the step S8, the vehicular velocity decrement variable $V_D$ is set to zero and the routine goes to the step S9.

It is noted that the vehicular velocity decrement variable calculation map, as shown by FIG. 5, has its lateral axis along which the lateral acceleration corrected value $Y_{GC}$ (G) is taken and its longitudinal axis along which the vehicular velocity decrement variable $V_D$ (G) is taken. The vehicular velocity decrement variable $V_D$ indicates zero when the lateral acceleration corrected value $Y_{GC}$ indicates zero.

While the lateral acceleration corrected value $Y_{GC}$ is increased up to a first predetermined correction value $Y_{GC1}$, the value of $V_D$ is progressively increased. While the value of $Y_{GC}$ is increased up to a vicinity to a second predetermined correction value $Y_{GC2}$, the gradient of the correction value $Y_{GC}$ is decreased. Thereafter, the gradient is increased up to a third predetermined correction value $Y_{GC3}$. When $Y_{GC} \geq Y_{GC3}$, the gradient of the value of $V_D$ becomes approximately zero. Such a characteristic line L as described above is drawn in FIG. 5 as denoted by a solid line.

Referring back to FIG. 3, at a step S9, the vehicular velocity decrement variable $V_D$ is converted into a vehicular velocity correction variable Vc (Km/h) which is the variation rate of the vehicular velocity per unit time.

At the next step S10, the vehicular velocity controlling section 50 subtracts the vehicular velocity correction value Vc from a previous vehicular velocity command value $V_T(n-1)$ to derive a previously corrected vehicular velocity command value $V_{REG}$.

At the next step S11, the vehicular velocity controlling section 50 compares the previously corrected vehicular velocity command value $V_{REG}$ with the selected target vehicular velocity V*. If $V_{REG} < V*$s at the step S11, the routine goes to a step S12.

At the step S12, a present vehicular velocity command value $V_T(n-1)$ is calculated by adding an acceleration set vehicular velocity $\Delta V_A$ to the previously corrected vehicular velocity command value $V_{REG}$ and the routine goes to a step S15.

If $V_{REG} = V*$s at the step S11, the routine goes to a step S13.

At the step S13, $V_T(n) = V_{REG}$.

If $V_{REG} > V*$s at the step S11, the routine goes to a step S14.

At the step S14, the present vehicular velocity command value $V_T(n)$ is calculated by subtracting a deceleration set vehicular velocity $\Delta V_D$ from the previously corrected vehicular velocity command value $V_{REG}$ ($V_T(n) = V_{REF} - \Delta V_D$).

At the step S15, the vehicular velocity controlling section 50 controls the throttle valve opening angle via the throttle actuator 3, the gear position of the automatic transmission T and the braking force of the vehicular brake system B on the basis of the above-described present vehicular velocity command value $V_T(n)$.

Then, the present timer interrupt routine is ended and control is returned to the main program routine.

The step S3 and the lateral acceleration (G) sensor 4 correspond to vehicular turning magnitude detecting means, the step S4 corresponds to correction coefficient calculating means, the steps S5 to S10 correspond to target vehicular velocity correcting means.

Figure 6:
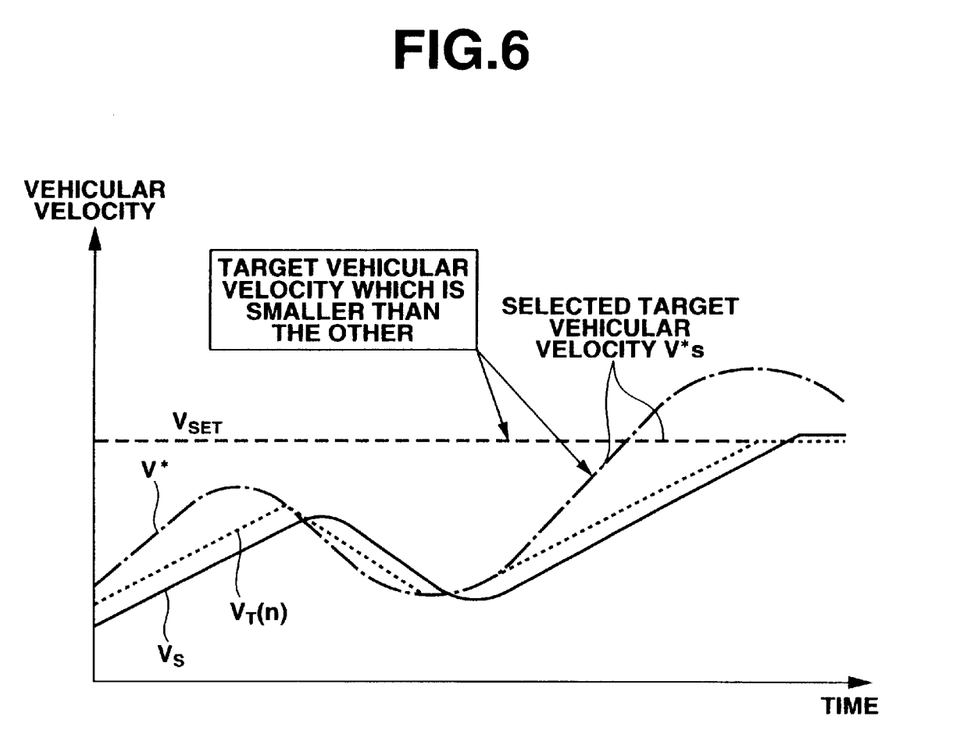
FIG. 6 is a timing chart for explaining a relationship between a selected vehicular velocity and a vehicular velocity command value in the vehicular velocity controlling section shown in FIG. 2.

Hence, as shown in FIG. 6, the vehicular velocity controlling section 50 sets one of the target vehicular velocity V* selected by the inter-vehicle distance controlling section 40 and the set vehicular velocity $V_{SET}$ by the vehicular driver which is smaller than the other as the selected target vehicular velocity Vs*, is increased by the vehicular set vehicular velocity $V_A$ when the present vehicular velocity command value $V_T(n)$ is smaller than the selected target vehicular velocity Vs*, and is decreased by the deceleration set vehicular velocity $V_D$ when the present vehicular velocity command value $V_T(n)$ is larger than the selected target vehicular velocity Vs*. Then, the vehicular velocity Vs is thus controlled in the way as described above to follow up the preceding vehicle.

Next, an operation of the above-described vehicular controlling apparatus in the preferred embodiment will be described below with reference to FIGS. 7A through 8E.

Figures 7A, 7B:
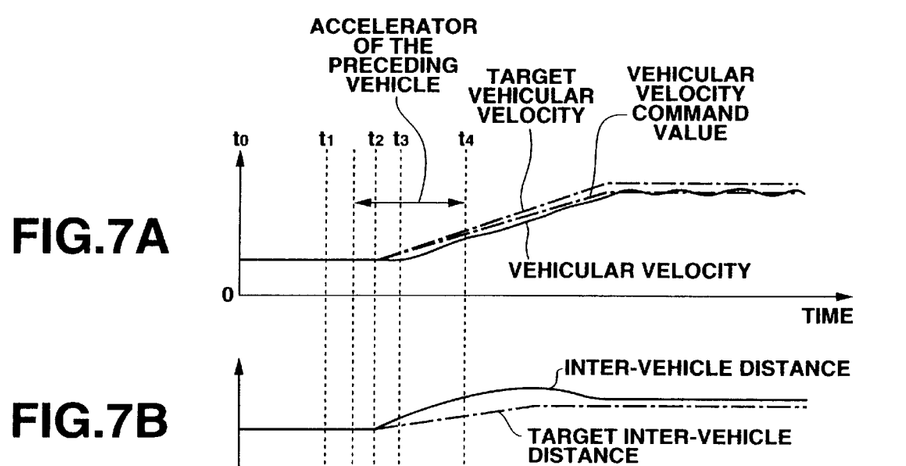
FIGS. 7A through 7E are integrally a timing chart for explaining an operation of the vehicular velocity controlling apparatus shown in FIG. 1A when the vehicle turns on a large corner (curved road) at a relatively low velocity region.

Suppose now that the vehicle is running straightly on, for example, a city street maintaining the target inter-vehicle distance to the preceding vehicle which is running at a constant velocity (cruising) at a time point t0, as shown in FIG. 7A. In this state, the actual inter-vehicle distance L is made generally equal to the target inter-vehicle distance L* as shown in FIG. 7B. Since the preceding vehicle is running at the constant velocity and the inter-vehicle distance $L_T$ is made coincident with the actual inter-vehicle distance L. The vehicular velocity V* is made equal to the preceding vehicle.

Figure 7C:
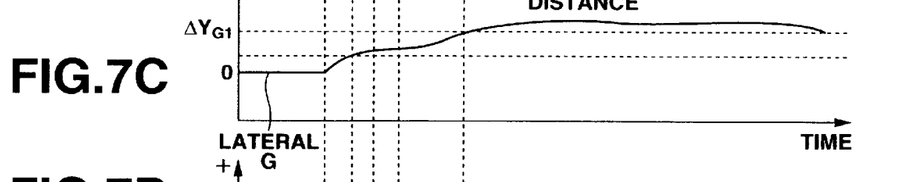

At this time, the vehicle is running straightly. Hence, the lateral acceleration $Y_G$ detected by the lateral acceleration sensor 4 maintains approximately zero as shown by FIG. 7C.

The vehicular velocity Vs is in a low vehicular velocity region.

Figure 7D:
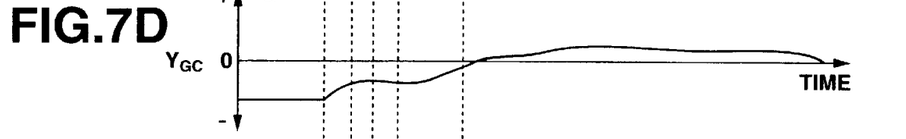
Figure 7E:
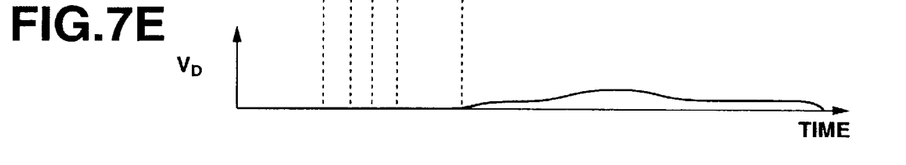

Since the correction coefficient $\Delta Y_G$ calculated at the step S4 in FIG. 3 indicates $\Delta Y_{G1}$ (first predetermined value), the lateral acceleration $Y_{GC}$ calculated by the step S5 indicates $-\Delta Y_{G1}$ as shown in FIG. 7D. Hence, the routine goes from the step S6 to the step S8. Therefore, the routine goes from the step S6 to the step S8. Therefore, the vehicular velocity decrement variable $V_D$ is set to zero G as shown by FIG. 7E.

The previous corrected vehicular velocity command value $V_{REG}$ calculated at the step S10 is made equal to the previous vehicular velocity command value $V_T(n-1)$. At this time, since the value of $V_{REG}$ is made equal to the pervious vehicular velocity command value $V_T(n-1)$. At this time, since the value of $V_{REG}$ is made equal to the target vehicular velocity V*, the routine goes to the step S11 to the step S13. The present vehicular velocity command value $V_T(n-1)$ is made equal to the previous vehicular velocity command value $V_T(n-1)$. The routine goes to the step S15. The throttle actuator 3 is controlled so that the opening angle of the throttle valve is adjusted to an angle such as to maintain the target vehicular velocity V* and the follow up run state at the cruise velocity is maintained.

Thereafter, when the preceding vehicle is about to enter a corner having a relatively large radius of curvature, the vehicle is, at a time point t2 shown in FIG. 7A, about to enter the same cornering. At the time point t2, the lateral acceleration $Y_G$ detected by the lateral acceleration sensor 4 is increased. Since the radius of curvature of the corner is large, the lateral acceleration YG is not so large. In addition, the vehicular velocity is in the relatively low velocity region, the correction coefficient $\Delta Y_G$ gives the first predetermined value $\Delta Y_{G1}$ at the step S8 in FIG. 3.

The lateral acceleration correction value $Y_{GC}$ continues to indicate a negative value. The vehicular velocity decrement variable $V_D$ continues to indicate the state of zero and the vehicle is continued to follow up the preceding vehicle at the target inter-vehicle distance L*.

At a time point t2, the preceding vehicle has passed, for example, about half the corner to run at an acceleration state. Accordingly, the actual inter-vehicle distance L detected by the inter-vehicle distance sensor 1 is increased by the target inter-vehicle distance L*, as denoted by a dot-and-dash line of FIG. 7A.

The lateral acceleration corrected value $Y_{GC}$ continues to indicate a negative value.

Hence, the vehicular velocity decrement variable $V_D$ maintains zero G. Since the target vehicular velocity V* is increased, the routine goes from the step S11 to the step S12. The acceleration set vehicular velocity $\Delta V_A$ is added to the previous corrected vehicular velocity command value $V_T(n)$. Accordingly, the vehicular velocity Vs is increased at a time point t3 with a predetermined response delay.

The lateral acceleration $Y_G$ is also increased which is detected by the lateral acceleration (G) sensor 4. When, at a time point t4, the lateral acceleration sensor value $Y_G$ is slightly in excess of the correction coefficient $\Delta Y_G$ as shown in FIG. 7D indicates a positive value.

Hence, the routine goes from the step S6 to the step S7. The vehicular velocity decrement variable $V_D$ calculated by referring to FIG. 4 is increased from zero G. The vehicular velocity correction value Vc calculated is increased from 0 km/h. Hence, the previous corrected vehicular velocity command value $V_{REG}$ is decreased and the increase of the target vehicular velocity V* is continued. Therefore, the routine goes from the step S11 to the step S12. Hence, the acceleration set vehicular velocity $\Delta V_A$ is added to the previous corrected vehicular velocity command value $V_{REG}$. The increase of the present vehicular velocity command value $V_T(n)$ is slightly suppressed by the decrease in the previous corrected vehicular velocity command value $V_{REG}$.

Thereafter, as the lateral acceleration $Y_G$ is increased in the positive direction, the vehicular velocity correction value Vc is accordingly increased.

The vehicular velocity correction value Vc is subtracted from the previous corrected vehicular velocity command value $V_{REG}$. Therefore, the vehicular velocity command value $V_T$ is slightly reduced as compared with a case where no correction of the lateral acceleration is made so that the vehicular velocity is controlled so as to coincide with the vehicular velocity command value $V_T$.

At this time, the actual inter-vehicle distance L is controlled in a state slightly larger than the target inter-vehicle distance L* and the vehicle is accelerated to follow up the accelerating preceding vehicle.

Suppose, however, that the preceding vehicle is about to enter the same corner at the relatively high velocity region and the vehicle is running to follow up the preceding vehicle. Hence, the correction coefficient $\Delta Y_G$ calculated at the step S8 in the inter-vehicle distance controlling section 40 in FIG. 3 becomes smaller by about one-fourth the correction coefficient at the relatively low vehicular velocity region. In addition, since the lateral acceleration $Y_G$ detected by the lateral acceleration sensor 4 becomes large as compared with the acceleration sensor as shown in FIG. 8C.

Figure 8A:
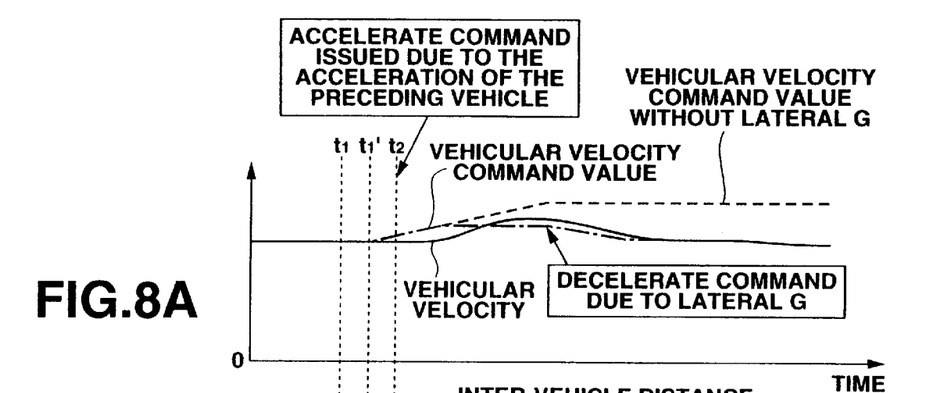
FIGS. 8A through 8E are integrally a timing chart for explaining the operation of the vehicular velocity controlling apparatus when the vehicle turns on the large corner (curved road) at a relatively high velocity region.
Figure 8B:
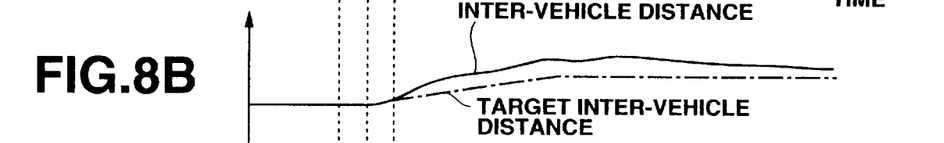
Figure 8C:
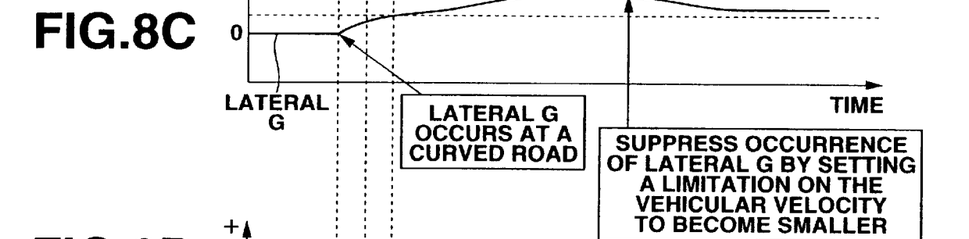
Figure 8D:
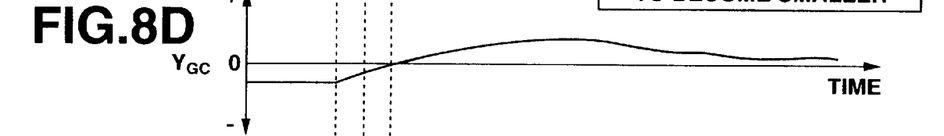
Figure 8E:
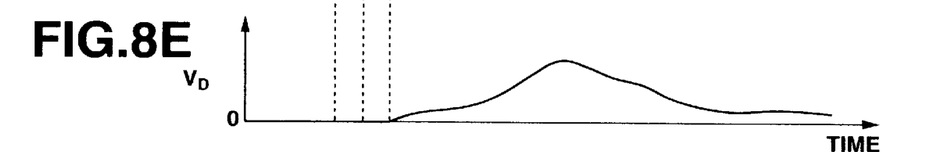

As shown in FIG. 8A, the correction coefficient value $\Delta Y_G$ calculated at the step S8 in the inter-vehicle distance control procedure in FIG. 3 becomes smaller by about one-fourth the correction coefficient at the relatively low vehicular velocity region. In addition, since the lateral acceleration $Y_G$ detected by the lateral acceleration sensor 4 becomes large as compared with a case of the low vehicular velocity region as shown in FIG. 8C. As shown in FIG. 8D, the lateral acceleration correction value $Y_{GC}$ indicates some positive value at a time point t1' immediately after the time point t1 shown in FIG. 8A. Accordingly, the vehicular velocity decrement variable $V_D$ is increased as shown in FIG. 8E. Hence, the previous corrected vehicular velocity command value $V_{REG}$ is quickly started to be decreased. In addition, an increase tendency of the vehicular velocity command value $V_T(n)$ becomes dull as compared with a case where no limitation on the lateral acceleration $Y_G$ denoted by a broken line shown in FIG. 8A.

Thereafter, when the acceleration of the preceding vehicle is started at a later half the corner at a time point t2, the actual inter-vehicle distance L is increased by the target inter-vehicle distance L*. Hence, the target vehicular velocity V* is increased. The lateral acceleration correction (or corrected) value $Y_{GC}$ is accordingly increased. The vehicular velocity decrement variable $V_D$ is quickly increased. If the vehicular velocity decrement variable $V_D$ becomes equal to the acceleration corresponding to the acceleration set vehicular velocity $\Delta V_A$, the target vehicular velocity V* is accordingly increased. Then, the present vehicular velocity command value $V_T(n)$ becomes equal to the previous vehicular velocity command value $V_T(n-1)$ so that the vehicular velocity is held.

Thereafter, the lateral acceleration $Y_G$ is increased so that the vehicular velocity decrement variable $V_D$ is in excess of the acceleration corresponding to the acceleration set vehicular velocity $\Delta V_A$. At this time, the present vehicular velocity command value $V_T(n)$ calculated at the step S12 becomes smaller than the previous vehicular velocity command value $V_T(n-1)$. Therefore, the vehicle is in the deceleration control state and the vehicular velocity Vs is decreased. The acceleration state of the vehicle when the vehicle is passing the corner at the relatively high vehicular velocity region is suppressed so that no mismatch to the driver's driving sense occurs and an optimum vehicular velocity control during the corner can be achieved.

Thereafter, when the lateral acceleration $Y_G$ detected by the lateral acceleration sensor 4 becomes smaller, the vehicle passing the corner, the lateral acceleration corrected value $Y_{GC}$ becomes accordingly small.

At this time, since the lateral acceleration correction value $T_{GC}$ becomes accordingly small.

At this time, since the lateral acceleration correction value $Y_{GC}$ becomes accordingly small, the vehicular velocity decrement variable $V_D$ indicates the small value. Hence, the target vehicular velocity corrected value Vc* approaches to the target vehicular velocity Vc. When the vehicle is running straightly, the lateral acceleration corrected value $Y_{GC}$ indicates a negative value. Then, the vehicular velocity decrement variable value $V_D$ indicates zero.

Hence, the target vehicular velocity correction value Vc* approaches to the target vehicular velocity Vc. When the vehicle is running straightly, the lateral acceleration corrected value $Y_{GC}$ indicates negative and the vehicular velocity decrement variable $V_D$ indicates zero.

The target vehicular velocity V* is directly supplied to the vehicular velocity controlling section 50. Therefore, the vehicle is returned to the follow-up run state in which the actual inter-vehicle distance L is substantially made equal to the target inter-vehicle distance L* and the vehicle is returned to the follow-up run state.

In addition, when the vehicle is running with the preceding vehicle not trapped, the set vehicular velocity $V_{SET}$ is set as the selected target vehicular velocity V*s to maintain the set vehicular velocity $V_{SET}$. In this case, when the lateral acceleration $Y_G$ detected by the lateral G sensor 4 is increased during the entrance of the corner.

The vehicular velocity decrement variable $V_D$ in accordance with the lateral acceleration $Y_G$ and the vehicular velocity Vs is calculated. At this time, the vehicular velocity decrement variable $V_D$ in accordance with the lateral acceleration $Y_G$ and the vehicular velocity Vs is reduced.

An optimum vehicular velocity control can, thus, be achieved without occurrence of the mismatch to the driver's driving sense.

In the above-described embodiment, the correction coefficient $\Delta Y_G$ of the lateral acceleration $Y_G$ is set according to the vehicular velocity Vs. Then, the lateral acceleration correction value $Y_{GC}$ is calculated. Since the vehicular velocity decrement variable $V_D$ based on the lateral acceleration corrected value $Y_{GC}$ is calculated, the vehicle is to follow up the preceding vehicle in a state near the target vehicular velocity V*. The vehicular velocity control in accordance with the driver's driving sense can be made when the vehicle is running at the corner at the relatively high velocity region. Giving the mismatch to the vehicular driver's driving sense can accurately be eliminated.

Although, in the embodiment described above, the correction coefficient $\Delta Y_G$ is calculated by referring to the correction coefficient calculation map at the step S8 in the vehicular velocity controlling procedure of FIG. 3, the vehicular velocity controlling section 50 may determine if the vehicular velocity Vs is equal to or below the first predetermined vehicular velocity value V1. If Vs≧V1, the correction coefficient $\Delta Y_G$ may indicate the predetermined gradient $\Delta Y_{G1}$. If Vs<V1, the correction coefficient $\Delta Y_G$ may be calculated in accordance with the equation approximated to the characteristic line of FIG. 4. Alternatively, if Vs≈0, the correction coefficient $\Delta Y_G$ may indicate the predetermined value of $\Delta Y_{G1}$ or may linearly be decreased in accordance with the increase in the vehicular velocity Vs.

As the vehicular velocity Vs is increased, the correction coefficient may linearly be decreased.

In addition, in the vehicular decrease calculation map shown in FIG. 5, a straight line approximation as denoted by a broken line in FIG. 5 may be performed. In accordance with an equation of an approximate straight line, the vehicular velocity decrement variable $V_D$ may be calculated.

Furthermore, although, in the embodiment, the lateral acceleration sensor 4 is applied as the turning magnitude detecting means, a yaw rate (yaw angular velocity) sensor may be applied in place of the lateral G sensor.

The lateral acceleration $Y_G$ (=ψ·Vs) may, then, be calculated by multiplying the vehicular velocity Vs with the detected yaw rate.

Furthermore, a steering angle sensor to detect a steering angular displacement of a vehicular steering system may be applied in place of the lateral acceleration sensor.

The detected steering angular displacement θ of a vehicular steering system may be applied in place of the lateral acceleration sensor.

The detected steering angular displacement θ may be used to calculate the lateral acceleration $Y_G$ using the following equation (5). In summary, the vehicular running condition during the turning on the curved road (during the cornering) may be detected.

$$Y_G = Vs^2 \times \theta / (SF \times Vs^2 + 1) \times Lw \times Gs \quad (5)$$

In the equation (5), SF denotes a stability factor, Lw denotes a wheel base, Gs denotes a steering gear ratio.

In the embodiment, the correction coefficient $\Delta Y_G$ according to the vehicular velocity Vs by the vehicular velocity controlling section 50 is used to correct the lateral acceleration $Y_G$ to derive the lateral acceleration correction value $Y_{GC}$. The vehicular velocity decrement variable $V_D$ is, then, calculated on the basis of the lateral acceleration correction value $Y_{GC}$ and, then, is used to derive the vehicular velocity command value $V_T$.

However, the target vehicular velocity V* calculated by the inter-vehicle distance controlling section 40 may be decremented by the vehicular velocity corrected value Vc which accords with the vehicular velocity decrement variable value $V_D$ to calculate the corrected value Vc to calculate a corrected target vehicular velocity Vc* and the vehicular velocity controlling section may control the vehicular velocity Vs to make the vehicular velocity Vs substantially equal to the corrected target vehicular velocity Vc.

Although, in the embodiment described above, the target inter-vehicle distance L* is calculated on the basis of the vehicular velocity Vt of the preceding vehicle. However, the vehicular velocity Vs of the vehicle C may be applied in place of the vehicular velocity of the preceding vehicle Vt.

Although, in the above-described embodiment, the follow-up run controller 5 executes the inter-vehicle distance calculating procedure, a hardware of an electronic circuitry such as a combination of function generators, comparators, and arithmetic/logic unit may be applied.

Although, in the embodiment, the present invention is applicable to the rear wheel drive vehicle as shown in FIG. 1A. However, the present invention may alternatively be applied to a front wheel drive vehicle.

Although, in the embodiment, the engine E is applied as the rotary driving source, the present invention may be applied to an electric motor vehicle whose driving source is the electric motor or to a hybrid vehicle whose driving source is the electric motor or the engine.

The entire contents of a Japanese Patent Application No. Heisei 11-168262 (filed in Japan on Jun. 15, 1999) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A vehicular velocity controlling apparatus for an automotive vehicle, comprising:
   inter-vehicle distance detecting means for detecting an inter-vehicle distance from the vehicle to a preceding vehicle which is running ahead of the vehicle;
   relative velocity detecting means for detecting a relative velocity of the vehicle to the preceding vehicle;
   vehicular velocity detecting means for detecting a vehicular velocity of the vehicle;
   inter-vehicle distance controlling means for calculating a target value of the vehicular velocity to make a detected value of the inter-vehicle distance substantially equal to a target value of the inter-vehicle distance on the basis of the detected value of the inter-vehicle distance and a detected value of the vehicular velocity;
   vehicular velocity controlling means for controlling the vehicular velocity to make the detected value of the vehicular velocity substantially equal to the target value of the vehicular velocity;
   vehicular turning magnitude detecting means for detecting a magnitude of a turning of the vehicle;
   correction coefficient calculating means for calculating a correction coefficient of the magnitude of the vehicular turning in accordance with the detected value of the vehicular velocity; and
   target vehicular velocity correcting means for correcting the target value of the vehicular velocity on the basis of the turning magnitude correction coefficient by which the detected value of the turning magnitude is corrected.

2. A vehicular velocity controlling method for an automotive vehicle, comprising:
   detecting an inter-vehicle distance from the vehicle to a preceding vehicle which is running ahead of the vehicle;
   detecting a relative velocity of the vehicle to the preceding vehicle;

detecting a vehicular velocity of the vehicle;

calculating a target value of the vehicular velocity to make a detected value of the inter-vehicle distance substantially equal to a target value of the inter-vehicle distance on the basis of the detected value of the inter-vehicle distance and a detected value of the vehicular velocity;

controlling the vehicular velocity to make the detected value of the vehicular velocity substantially equal to the target value of the vehicular velocity;

detecting a magnitude of a turning of the vehicle;

calculating a correction coefficient of the magnitude of the turning of the vehicle in accordance with the detected value of the vehicular velocity; and correcting the target value of the vehicular velocity on the basis of the turning magnitude correction coefficient by which the detected value of the turning magnitude is corrected.

3. A vehicular velocity controlling apparatus for an automotive vehicle, comprising:

an inter-vehicle distance detector to detect an inter-vehicle distance from the vehicle to a preceding vehicle which is running ahead of the vehicle;

a relative velocity detector to detect a relative velocity of the vehicle to the preceding vehicle;

a vehicular velocity detector to detect a vehicular velocity of the vehicle;

an inter-vehicle distance controlling section that calculates a target value of the vehicular velocity to make a detected value of the inter-vehicle distance substantially equal to a target value of the inter-vehicle distance on the basis of the detected value of the inter-vehicle distance and a detected value of the vehicular velocity;

a vehicular velocity controlling section that controls the vehicular velocity to make the detected value of the vehicular velocity substantially equal to the target value of the vehicular velocity;

a vehicular turning magnitude detector to detect a magnitude of a turning of the vehicle;

a correction coefficient calculating section that calculates a correction coefficient of the magnitude of the turning in accordance with the detected value of the vehicular velocity; and a target vehicular velocity correcting section that corrects the target value of the vehicular velocity on the basis of the turning magnitude correction coefficient by which the detected value of the turning magnitude is corrected.

4. A vehicular velocity controlling apparatus for an automotive vehicle as claimed in claim 3, wherein the correction coefficient calculating section calculates the correction coefficient as the detected value of the vehicular velocity decreases, the correction coefficient becomes decreased.

5. A vehicular velocity controlling apparatus for an automotive vehicle as claimed in claim 3, wherein the target vehicular velocity correcting section includes a vehicular velocity decrement variable calculator to calculate a vehicular velocity decrement variable which is increased as the correction coefficient on the magnitude of the turning is increased and a vehicular velocity corrector to subtract the vehicular velocity decrement variable from the target value of the vehicular velocity to correct the target value of the vehicular velocity.

6. A vehicular velocity controlling apparatus for an automotive vehicle as claimed in claim 3, wherein the vehicular turning magnitude detector comprises a lateral acceleration detector to detect a lateral acceleration of the vehicle.

7. A vehicular velocity controlling apparatus for an automotive vehicle as claimed in claim 6, wherein the correction coefficient calculating section includes a lateral acceleration correction coefficient calculating section that calculates an correction coefficient $\Delta Y_G$ on the lateral acceleration of the vehicle in accordance with the detected value Vs of the vehicular velocity.

8. A vehicular velocity controlling apparatus for an automotive vehicle as claimed in claim 7, wherein the correction coefficient $\Delta Y_G$ on the lateral acceleration indicates a first predetermined value $\Delta Y_{G1}$ when the detected value of the vehicular velocity Vs ranges from zero to a first predetermined vehicular velocity V1, is reduced from the first predetermined velocity at a first predetermined gradient when the detected value of the vehicular velocity Vs ranges from the first predetermined vehicular velocity V1 to a second predetermined vehicular velocity V2, is reduced at a second predetermined gradient when the detected value Vs of the vehicular velocity ranges from the second predetermined vehicular velocity V2 to a third predetermined vehicular velocity V3, and is reduced at a third predetermined gradient when the detected value of the vehicular velocity exceeds the third predetermined vehicular velocity V3.

9. A vehicular velocity controlling apparatus for an automotive vehicle as claimed in claim 8, wherein the third predetermined gradient is smallest than both of the first and second predetermined gradients and the first predetermined gradient is largest than both of the second and third predetermined gradients.

10. A vehicular velocity controlling apparatus for an automotive vehicle as claimed in claim 8, wherein the correction coefficient calculating section calculates the corrected value $Y_{GC}$ on the lateral acceleration of the vehicle as follows: $Y_{GC}=|Y_G|-\Delta Y_G$.

11. A vehicular velocity controlling apparatus for an automotive vehicle as claimed in claim 10, wherein the target vehicular velocity correcting section includes: a target vehicular velocity decrement variable calculator to calculate a vehicular velocity decrement variable $V_D$ on the basis of the lateral acceleration corrected value $Y_{GC}$ when $Y_{GC} \geq 0$, the vehicular velocity decrement variable $V_D$ being zeroed when $Y_{GC}<0$; a converting section that converts the vehicular velocity variable $V_D$ into a vehicular velocity correction variable Vc which is a variation rate of the vehicular velocity per unit time; a subtractor to subtract the vehicular velocity correction variable Vc from the target vehicular velocity V* calculate by the inter-vehicle distance controlling section to derive the corrected target vehicular velocity Vc* and wherein controls an opening angle of an engine throttle valve, a gear position of a vehicular transmission, and a braking force to be exerted by a vehicular bake system on the basis of the corrected target value of the vehicular velocity Vc* to make the detected value of the vehicular velocity substantially equal to the corrected target value Vc* of the vehicular velocity.

12. A vehicular velocity controlling apparatus for an automotive vehicle as claimed in claim 10, wherein the target vehicular velocity correcting section includes: a target vehicular velocity decrement variable calculator to calculate a vehicular velocity decrement variable $V_D$ on the basis of the lateral acceleration corrected value $Y_{GC}$ when $Y_{GC} 24\ 0$, the vehicular velocity decrement variable $V_D$ being zeroed when $Y_{GC}<0$; a converting section that converts the vehicular velocity variable $V_D$ into a vehicular velocity correction variable Vc which is a variation rate of the vehicular velocity per unit time; a subtractor to subtract the vehicular velocity correction variable Vc from a previous vehicular velocity command value $V_T(n-1)$ to derive a previous corrected vehicular velocity command value $V_{REG}$; a comparator to compare the previous vehicular velocity command value $V_{REG}$ with the target value of the vehicular velocity V*s to determine whether $V_{REG}<V^*S$, $V_{REG}=Vs^*$, and $V_{REG}>Vs^*$; and a present vehicular velocity command value calculator to calculate a present vehicular velocity command value $V_T(n)$ as follows: $V_T(n)=V_{REG}+\Delta V_A$ when $V_{REG}<Vs^*$, wherein $\Delta V_A$ denotes an acceleration set vehicular velocity, $V_T(n)=V_{REG}$ when $V_{REG}=Vs^*$, and $V_T(n)=V_{REG}-\Delta V_D$ when $V_{REG}<Vs^*$, wherein $\Delta V_D$ denotes a deceleration set vehicular velocity.

13. A vehicular velocity controlling apparatus for an automotive vehicle as claimed in claim 12, wherein the vehicular velocity controlling section controls an opening angle of an engine throttle valve, a gear position of a vehicular transmission, and a braking force to be exerted by a vehicular bake system on the basis of the present vehicular velocity command value $V_T(n)$ to make the detected value of the vehicular velocity substantially equal to the present vehicular velocity command value $V_T(n)$.

14. A vehicular velocity controlling apparatus for an automotive vehicle as claimed in claim 12, wherein the vehicular velocity variable calculator calculates the vehicular velocity decrement variable $V_D$ in such a manner that as the lateral acceleration correction variable $Y_{GC}$ becomes large, the vehicular velocity decrement variable $V_D$ generally becomes large.

* * * * *